United States Patent
Mizrachi

(10) Patent No.: US 8,770,149 B2
(45) Date of Patent: Jul. 8, 2014

(54) SYSTEM FOR BREEDING AQUATIC FAUNA

(75) Inventor: Aviv Mizrachi, Givat Ada (IL)

(73) Assignee: Bio Booot Ltd., Ramat Gan (IL)

( * ) Notice: Subject to any disclaimer, the term of this patent is extended or adjusted under 35 U.S.C. 154(b) by 0 days.

(21) Appl. No.: 13/809,625

(22) PCT Filed: Jul. 13, 2011

(86) PCT No.: PCT/IL2011/000559
§ 371 (c)(1),
(2), (4) Date: Jan. 11, 2013

(87) PCT Pub. No.: WO2012/007947
PCT Pub. Date: Jan. 19, 2012

(65) Prior Publication Data
US 2013/0112151 A1 May 9, 2013

Related U.S. Application Data

(60) Provisional application No. 61/363,736, filed on Jul. 13, 2010.

(51) Int. Cl.
*A01K 61/00* (2006.01)

(52) U.S. Cl.
USPC .......................................... 119/223; 135/117

(58) Field of Classification Search
USPC ................. 119/223, 226, 227, 228, 229, 239; 135/117
See application file for complete search history.

(56) References Cited

U.S. PATENT DOCUMENTS

| | | | | |
|---|---|---|---|---|
| 313,458 | A * | 3/1885 | Turner | 119/228 |
| 3,237,339 | A * | 3/1966 | Rice | 43/44.99 |
| 3,698,359 | A | 10/1972 | Fremont | |
| 4,205,625 | A | 6/1980 | Muller-Feuga | |
| 4,711,199 | A | 12/1987 | Nyman | |
| 4,747,369 | A * | 5/1988 | Gotmalm | 119/223 |
| 4,936,253 | A | 6/1990 | Otamendi-Busto | |
| 5,095,851 | A * | 3/1992 | Bourg | 119/223 |
| 5,329,719 | A * | 7/1994 | Holyoak | 43/6.5 |
| 5,715,773 | A * | 2/1998 | Martelius | 119/223 |
| 5,762,024 | A | 6/1998 | Meilahn | |

(Continued)

FOREIGN PATENT DOCUMENTS

| | | |
|---|---|---|
| DE | 102006020128 A1 | 4/2006 |
| WO | 0165925 A1 | 9/2001 |
| WO | 2005082136 A1 | 9/2005 |
| WO | 2006004415 A1 | 1/2006 |

OTHER PUBLICATIONS

PCT/IL2011/000559, International Search Report, mailed Nov. 22, 2011.

*Primary Examiner* — Rob Swiatek
*Assistant Examiner* — George Andonyan
(74) *Attorney, Agent, or Firm* — Wiggin and Dana LLP; Gregory S. Rosenblatt

(57) ABSTRACT

The invention provides a breeding system for aquatic fauna that includes a chamber (2) having a wall (4) made from a water impermeable material. In one embodiment the chamber is provided with one or more hatches (20) in the wall where each hatch can be opened to a selectable extent. In another embodiment, the chamber has a selectable volume. The breeding system according to another embodiment includes one or more of the life support systems (30) adapted to be submerged in water.

17 Claims, 2 Drawing Sheets

(56) References Cited

U.S. PATENT DOCUMENTS

| | | | |
|---|---|---|---|
| 2004/0149233 A1* | 8/2004 | Cummins | 119/227 |
| 2006/0096548 A1* | 5/2006 | Ytterland et al. | 119/223 |
| 2006/0102087 A1* | 5/2006 | Page | 119/223 |
| 2008/0000429 A1* | 1/2008 | Page | 119/223 |
| 2011/0126447 A1* | 6/2011 | Thorvardarson et al. | 43/103 |
| 2011/0174232 A1 | 7/2011 | Hoie | |

* cited by examiner

SYSTEM FOR BREEDING AQUATIC FAUNA

CROSS REFERENCE TO RELATED APPLICATION

This patent application claims the benefit of the filing dates of United States Provisional Patent Application Serial No. US 61/363,736 that was filed on Jul. 13, 2010 and International Patent Application Serial No. PCT/IL2011/000559 that was filed on Jul. 13, 2011, both titled, "System for Breeding Aquatic Fauna." The subject matter of both US 61/363,736 and PCT/IL2011/000559 is incorporated by reference in its entirety herein.

FIELD OF THE INVENTION

This invention relates to chambers for breeding or rearing aquatic fauna.

BACKGROUND OF THE INVENTION

The term "marine farming" is used to refer to the breeding of marine fauna under controlled conditions in confined spaces. Confinement of the fauna tends to simplify the supply of nutrients and other requirements, as well as waste removal.

Several types of confined habitats for cultivating fish and other aquatic fauna are known. One type of system for breeding and rearing aquatic animals uses extensive ponds. Other breeding systems retain the animals in a chamber submerged in a body of water such as an off-shore site in a river, lake or sea. In open chambers, also known as "cages" and "flow through systems", ambient water flows through the chamber providing oxygen and nutrients to the confined organisms, while at the same time removing waste products.

Closed systems have a chamber made from a water impermeable material. The chamber is filled with water and other substances which are thus separate from the surrounding environment. Closed chambers, also known as "recirculated aquaculture systems" (RAS), allow the composition of the chamber to be designed as required for the specific fauna being bred. In these chambers, nutrients, oxygen and other required substances must continuously be delivered into the chamber and waste products must be continuously removed or otherwise neutralized. During the fattening stage of growth, for example, the amount of nutrients delivered to fish should be proportional to the biomass density. Typically the daily nutrient mass is around 1.5% of the biomass. The amount of nutrients provided will determine the amount of toxic waste, such as ammonia and other nitrogenous compounds, $CO_2$, and solid waste, released by the organisms. The amount of nutrients provided, as well as and other factors such as temperature, will also determine the oxygen requirement.

There are many known approaches and engineering methods for RAS systems that can be used in order to create the breeding conditions that optimize the output of the system.

In order to minimize costs and volume of these engineering R.A.S treatment systems, a water intake/water replacement system is employed that typically replaces about 10%-30% of the water in the tank with fresh water every day. Water replacement adds costs to the maintenance of the system as it adds to the energy costs especially when the added water is not at the optimum temperature and has to be heated or cooled. Water replacement can also create environmental problems. Thus, there are RAS systems that utilize complete water recycling, and do not add any fresh water to the tank.

Closed systems have associated life support systems that maintain optimal inside the chamber with respect to such parameters as temperature, nutrient composition, waste removal, biomass density, pH and oxygen concentration. The magnitude of the life support systems is determined to a large extent by the amount of nutrients added per day and the rate of water replacement.

Both open and closed systems protect the confined organisms from predators. Open cages have the advantage that oxygen does not have to be supplied exogenously if the biomass densities are not too intensive. Biomass densities of up to around 30 kg per cubic meter of water can usually be maintained in open systems without the need to supply exogenous oxygen. In open systems, toxic byproducts are flushed out, which is another advantage of open systems. On the other hand closed systems have the advantage that conditions inside the chamber, for example, water temperature, pH, and the water composition can be controlled as desired, while protecting the environment. Closed systems also protect the organisms from detrimental environmental factors such as toxins, pollution, and pathogens. Furthermore, higher biomasses are typically attainable in closed systems as opposed to open systems.

U.S. Pat. No. 4,205,625 to Muller-Feuga discloses a chamber for breeding and raising marine animals The chamber is composed of a flexible film which is inert with respect to a marine environment. A pump introduces water under a pressure greater than the surrounding environment into the chamber, and discharge openings are provided through which the water discharges.

U.S. Pat. No. 4,936,253 to Otamendi-Busto discloses a marine fish farm including a submersible cultivation cage and ballast tanks, and a tower, in which maintenance and personnel facilities are located. The depth of the cultivation cage is adjusted by the ballast tanks so that the cage is always below the level of influence of sea waves.

U.S. Pat. No. 5,762,024 to Meilahn discloses an aquaculture system having a rigid-walled floating tank that is positioned in a body of water. Water is provided to the tank via a floating pump assembly that is positioned in the body of water external to the tank. An inlet of the pump assembly is movable and may be positioned in a desired location and depth of the body of water, such that clean water that is free of surface contaminants and that is at a selected temperature is provided to the tank.

SUMMARY OF THE INVENTION

In its first aspect, the present invention provides a breeding system for aquatic fauna. In accordance with this aspect of the invention, the breeding system of the invention has a chamber that is provided with one or more hatches. Each hatch has a hatch cover that can be in a closed position or in a selectable open position. The chamber of the system of the invention is thus interconvertible between a closed state and an open state. Furthermore, the extent to which the hatches are open can be selected. When the hatches are partially open, the breeding system is a hybrid of a flow through system and an R.A.S. system.

For a system that is normally open, the system can be converted to a closed state, for example, when adverse environmental conditions arise, to prevent loss of nutrients and temperature changes. Closing of the system can prevent or reduce release of pollutants from the system to the environment, or uptake of pollutants by the system from the environment. Closing the system can prevent or reduce passage of pathogens between neighboring systems, as often happens in fish cage farms ("flow through" systems').

For a system that is normally closed, opening the hatches can serve, for example, for rapid aeration, rapid delivery of medical or chemical treatments, or when any of the life support systems associated with the breeding system fail. Opening the hatches can mitigate the effects of transient extreme water currents that might otherwise damage the system. Rain can raise the water level in the chamber and could cause the chamber to sink. Opening the hatches can be used to release excess water from the chamber and prevent sinking of the chamber. The hatches can also be opened for diluting disinfectants that had to be introduced into the system for any reason.

Appropriate selection of the extent of opening of the hatches may facilitate compliance with regulations concerning such breeding systems and their interactions with the environment.

In another aspect of the invention, the present invention provides a breeding system for aquatic fauna having an adjustable volume. The volume may be adjusted, for example, adapting the volume of the chamber to the amount of biomass present in the chamber. Adjusting the volume of the chamber to the minimal volume needed at any time, reduces wear of the system, a smaller chamber is less affected by physical environmental factors such as fouling, water currents and waves. This also decreases the need to remove or add fauna to the chamber. By setting the volume of the chamber according the biomass present in the chamber, the energy requirements of the life support systems can be tuned to the amount of biomass. Reducing the volume of the chamber also facilitates removal of fish and other aquatic fauna from the chamber, for example, during harvesting of the fish and other aquatic fauna or any one of various treatments.

In yet another of its aspects, the invention provides a breeding system for aquatic fauna comprising a chamber. In accordance with this aspect of the invention, the breeding system includes one or more life support RAS systems and/or environmentally oriented treatment systems that are adapted for being submerged in water. The life support RAS systems and/or environmentally oriented treatment systems may be submerged in water contained in the chamber or may be submerged in water surrounding the chamber.

In still another aspect of the invention, the invention provides a breeding system for aquatic fauna comprising a chamber and one or more life support RAS systems and/or environmentally oriented treatment systems. In accordance with this aspect of the invention, there is provided one or more of the life support RAS systems and/or environmentally oriented treatment systems, at least a portion of which is integral with the wall of the chamber. For example, the life support system or treatment system may include a container that is integral with the wall of the chamber. The container may be made from a rigid material or a flexible material. The container can serve to contain substances to be introduced into the chamber or for the temporary storage of substances removed from the chamber by an environmentally oriented treatment system. The life support systems will typically include as well, pipes or tubes and for the conduction of substances from the container and the chamber of the system. Parts of the life support system, other than the container, can be separate from the chamber. For example, parts of the life support systems can be located on land or on a floating platform, without being submerged.

The life support systems can be, for example, biofilters, anaerobic reactors, foam fractionators, energy systems, mechanical disinfecting tools such as ultraviolet radiation, ozone delivery, and feeders. The life support systems' can also be environmental treatment systems. In RAS systems with complete water recirculation, (no fresh water intake) for example, the minimum environmental effect is achieved by breakdown of toxins in a very large volume of biofilters and anaerobic reactors before the water is recirculated back to the fish tank.

Thus, in one of its aspects, the invention provides a breeding system for aquatic fauna comprising:
 (a) a chamber having a wall made from a water impermeable material;
 (b) one or more hatches in the wall, each hatch having a hatch cover;
  wherein each hatch cover can be in a closed position in which the hatch is hermetically sealed and in a selectable open position.

In the breeding system of this aspect of the invention, the hatch may comprise a shutter configured to be drawn to a selectable extent. The hatch may further comprise a screen or net.

In another of its aspects, the invention provides a breeding system for breeding aquatic fauna comprising a chamber having a wall made from a water impermeable material, the chamber having a selectable volume. For example, the wall of the chamber may be provided with an array of rings for adjusting the volume of the chamber.

In still another of its aspects, the invention provides a breeding system for aquatic fauna comprising:
 (a) a chamber having a wall made from a water impermeable material;
 (b) one or more of the life support systems adapted to be submerged in water.

In the breeding system in accordance with this aspect of the invention, at least one of the life support systems adapted to be submerged in water may comprise a container that is integral with the chamber wall. The container may be made from a flexible material.

In the breeding system of the invention, the wall of the chamber may comprise any one or more of a rigid material, a flexible material or an elastic material.

The breeding system of the invention may further comprise any one or more of an anchoring device, a floating device, a cover adapted to cover the chamber, and artificial illumination means for illuminating water contained in the chamber. The illumination may have a wavelength of about 400 nm. The wall of the chamber may be adapted for light filtering.

The breeding system of the invention may further comprise any one or more of one or more inflatable bladders in a wall of the chamber, a service platform or a conical sump. The wall of the sump may have a selectable slope.

The breeding system of the invention may further comprise one or more pressure valves that prevent the pressure inside the chamber from exceeding a predetermined pressure. The breeding system may further comprise one or more life support RAS systems, and/or environmentally oriented treatment systems

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
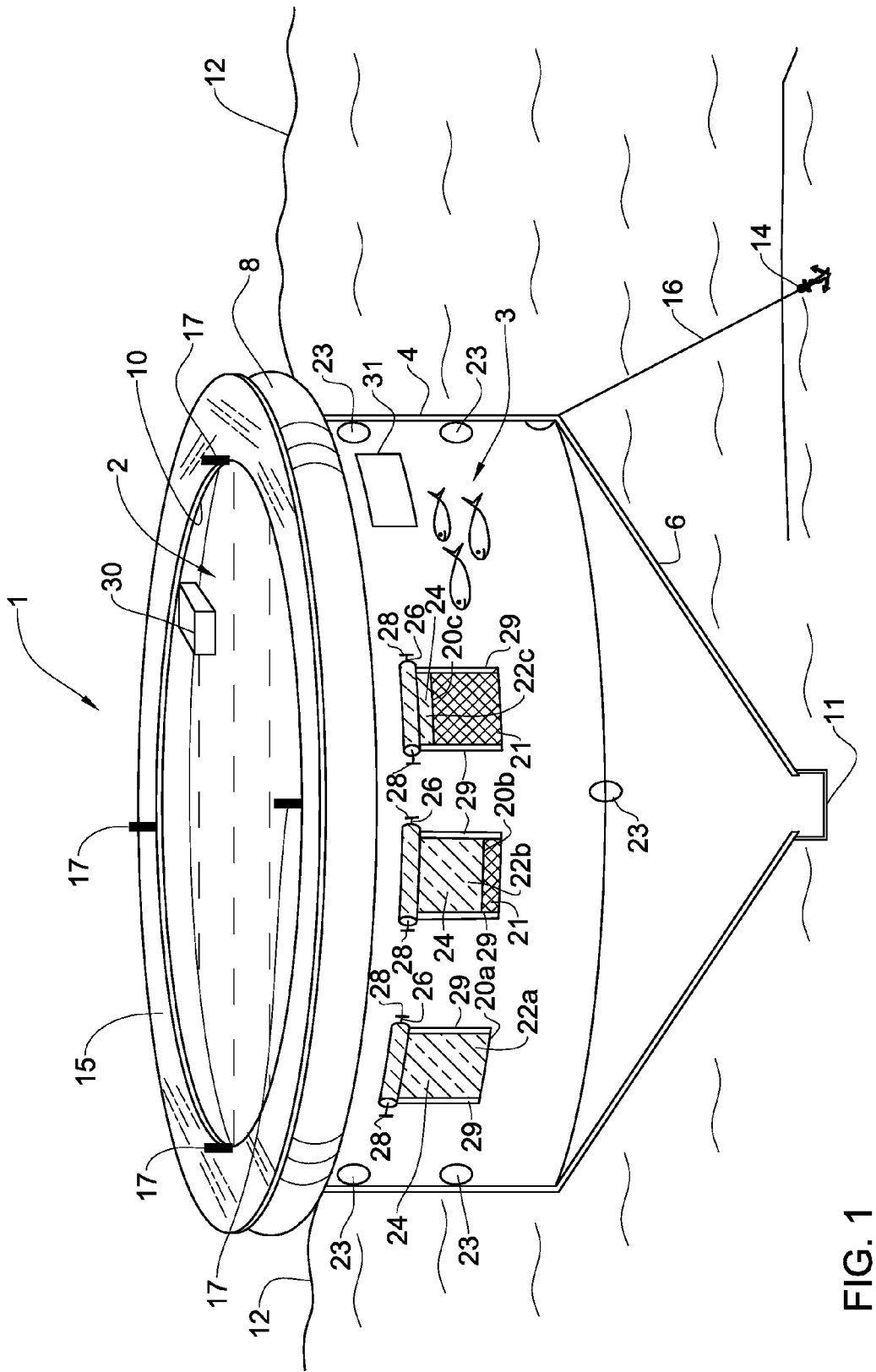
FIG. 1 shows a breeding system for fish and other aquatic organisms in accordance with one embodiment of the invention.

FIG. 1 shows a breeding system 1 for fish and other aquatic fauna 3 in accordance with one embodiment of the invention. The breeding system 1 has a chamber 2 having a wall 4 made from a watertight material that is inert with respect to the environment. The chamber 2 can be filled with water having any desired composition. The volume of the chamber 2 may be, for example, from 1 cubic meter to $10^5$ cubic meters. The material of the wall 4 may be rigid, flexible, or elastic. A variety of films that are inert to a marine environment are known and include such materials as polyurethane, polypropylene and neoprene. The chamber 2 has a generally cylindrical shape, with a conical sump 6 at the bottom of the chamber in which waste products and detritus (e.g. dead fish and other aquatic organisms) collect. Material collecting in the sump 6 can be removed from the chamber 2 through a bottom hatch 11. The breeding chamber 2 further includes a torroidal float 8 that surrounds the upper rim 10 of the chamber and maintains the upper rim 10 above the ambient water surface 12 when the chamber is filled with water. The float 8 may also be integral to the wall 4 of chamber 2. Above the float 8 is an annular service platform 15 surrounding the rim 10. An attendant can stand or kneel on the service platform while attending to the maintenance of the system. An anchor 14 connected to the chamber 2 or to the float 8 by means of a chain or cable 16 prevents migration of the chamber. A floating or hanging anchor-weight may also be used to prevent flipping and to maintain a constant volume or shape of the chamber under unstable conditions in the surrounding water 12.

In the embodiment of FIG. 1, the chamber 2 is open to the atmosphere.

Detritus and waste products that are to be removed from the chamber through the bottom hatch 11 can be urged towards the hatch 11 by creating a circulation of water in the chamber. The sloping wall of the conical sump tends to create a centrifugal flow towards the bottom of the sump. The wall of the conical sump 6 may have a selectable slope. The slope of the sump can be selected in order to achieve a desired rate of downward centrifugal flow in the presence of a water circulation in the chamber.

The chamber 2 is provided with one or more hatches 20 having an adjustable hatch cover 22. The hatch cover 22 can be in closed position or a selectable open position. For example, the hatch cover 22a of the hatch 20a is fixed in a closed position, so the hatch 20a is hermetically sealed, and water cannot pass through the hatch 20a in either direction. The hatch cover 22b of the hatch 20b is fixed in a slightly opened position in comparison to the hatch cover 22c of the hatch 20c, which has been fixed in a more markedly open position. Each hatch 20 is provided with a screen 21 to prevent escape of the aquatic fauna 3 when the hatch is open while allowing flow of water through the screen.

In the chamber 2 shown in FIG. 1, the hatch cover 22 comprises a shutter 24 made of a flexible sheet of material that is rolled on an axle 26 supported by end supports 28. The shutter 24 can be drawn to a selectable extent and fixed in a selectable position, as exemplified by the hatch covers 22a, 22b, and 22c. The shutter 24 has lateral edges that pass through guides 29 attached to the wall 4 of the chamber 2 adjacent to the hatch opening. The guides 29 form a hermetic seal between the lateral edges and the wall 4 of the chamber 2. Opening one or more of the hatches to desired extent allows a controlled exchange of water and other materials between the interior of the chamber 2 and the environment.

The breeding system 1 may further comprise various bioengineering or life support systems 30. Such life support systems 30 may include, for example, any one or more of a system for oxygenating the water, a system for removal of $CO_2$, a system for aerobic biofiltration for the breakdown of ammonia and other nitrates, a skimmer for removing scum and floating debris, systems for the breakdown of solids and solutes, a system for disinfection, a control system, an energy system, a climate control system, a feeding system, a pumping system for filling and voiding the chamber 2, a mixing system for mixing the contents of the chamber, and a system for sedimenting waste products towards the sump 6. In order to prevent or reduce effects of the system 1 on the environment, the life support systems may include one or more systems for solid and liquid waste management. Such systems tend to reduce or eliminate the need to release untreated wastes into the environment.

Any one or more of the life support systems may be external to the chamber 2, internal to the chamber 2, or integral with the chamber 2. Any one of more of the life support systems 30 may be submerged in the water contained in the chamber 2 or may be submerged in the ambient water 12 surrounding the system 1. Any one of more of the life support systems 30 may include a container 31 (illustrated in FIG. 2) for collecting waste material removed from the chamber 2 or for storing substances to be introduced into the chamber. The container 31 may be made from a flexible material and may be integral with the wall 4 of the chamber 2.

The breeding system 1 may further comprise one or more monitoring systems for monitoring conditions in the chamber 2. Such monitoring systems may include any one or more of a system for monitoring the level of a substance in the water of the chamber 2, water pH, temperature, oxygen level and $CO_2$ level ammonia, nitrate, nitrite levels.

The wall 4 of the chamber 2 may include insulating material for thermally insulating the water from the environment. The surface of the wall 4 may be treated or coated in order to prevent biological fouling of the surface, for example, as caused, by algae, or non biological fouling. The wall 4 of the chamber 2 may be transparent or opaque as required in any application, in order, to enhance cultivation or to reduce adverse biological effects on cultivation such as pathogens, and fouling.

Figure 2:
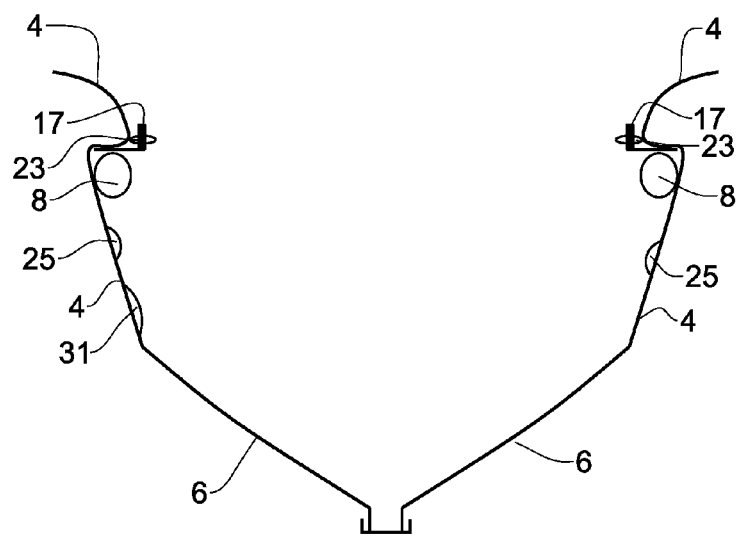
FIG. 2 shows the breeding system of FIG. 1 after reduction in the volume of the breeding chamber.

The volume the chamber 2 may be adjusted to an appropriate volume as required in any application. As shown in FIG. 1, this may be accomplished, for example, by providing a plurality of pegs 17 around the inner circumference of the service platform 15. Rings 23 are arranged in one or more rows on the internal or external surface of the wall 4 of the chamber 2 around a circumference of the cylindrical portion of the chamber 2. The rings 23 in one or more of the rows can be hooked onto the pegs 17 of the chamber 2 FIG. 2 shows the system 1 in a cross section through a diameter of the chamber 2 after hooking the topmost row of rings 23 on the pegs 17. The wall 4 of the chamber 2 has been pulled up, on the inner aspect of the float 8 and the rings hooked on the pegs 17. The wall 4 of the chamber 2 may be provided with one or more inflatable bladders 25 that can be inflated with air in order to facilitate lifting the wall 4 in order to hook the rings 23 on the pegs 17

In one embodiment of the invention in the chamber 2 is provided with a cover (not shown). Covering of the chamber 2 or one or more life support RAS systems and/or environmentally oriented treatment systems 30 and container 31, facilitates temperature control and the collection of substances, such as $CO_2$ or methane that evaporate from the water surface in the chamber or from one or more of the life support RAS systems, and/or environmentally oriented treatment systems 30 and container 31. Covering also provides protection from predators such as predatory birds. The closed system may further include one or more pressure valves that prevent the pressure inside the chamber from exceeding a predetermined pressure.

The system 1 may be provided with means for illumination. The illumination may be selected to induce a desired physiological effect on the aquatic fauna 3 in the chamber 2. For example, illumination with light having a wavelength around 400 nm can be used to induce a transformation in some aquatic animals from a sexual reproducing lifestyle to an asexual life style. Maintaining the aquatic animals in an asexual life style tends to increase muscle mass of the animals and shortens the breeding cycle.

The invention claimed is:

1. A breeding system for aquatic fauna comprising:
   (a) a chamber having a wall made from a water impermeable and flexible material, said material being inert to marine environment;
   (b) a plurality of screened hatches in the wall, each hatch having a hatch cover; and
   (c) one or more life support systems;
      wherein the chamber is configured to be submerged in water,
      wherein each hatch cover may independent of other hatch covers be in a selectable open position or closed position, wherein when all of the plurality of hatch covers are in a closed position the chamber is hermetically sealed from said marine environment,
      wherein the wall of the chamber is provided with an array of rings and pegs for adjusting the volume of the chamber, and
      wherein one or more inflatable bladders are affixed to an interior side of the wall of the chamber, such that said one or more inflatable bladders can be inflated with air to facilitate lifting said wall in order to hook the rings onto the pegs.

2. The breeding system according to claim 1, wherein each hatch cover is a shutter formed from a flexible sheet that is configured to be drawn to a selectable extent with a remainder of said flexible sheet rolled up on an axle.

3. The breeding system according to claim 2 wherein lateral edges of said hatch cover pass through guides attached to said wall to form a hermetic seal when said hatch cover is closed.

4. The breeding system according to claim 1 wherein the at least one life support system is adapted to be submerged in water.

5. The breeding system of claim 4 wherein the one or more life support systems includes either a recirculated aquaculture system or an environmentally oriented treatment system as a container that is integral with the chamber wall.

6. The breeding system according to claim 5 wherein the container is made from a flexible material.

7. The breeding system according to claim 1, wherein the wall of the chamber comprises an elastic material.

8. The breeding system according to claim 1, comprising an anchoring device.

9. The breeding system according to claim 1, comprising a floating device.

10. The breeding system according to claim 1, comprising a cover adapted to cover the chamber.

11. The breeding system according to claim 1, comprising artificial illumination for illuminating water contained in the chamber.

12. The breeding system according to claim 11, wherein the illumination has a wavelength of about 400 nm.

13. The breeding system according to claim 1, wherein the wall of the chamber is adapted for light filtering.

14. The breeding system according to claim 1, comprising a conical sump.

15. The breeding system according to claim 14 wherein the wall of the sump has a selectable slope.

16. The breeding system according to claim 1, comprising a service platform.

17. The breeding system according to claim 1, comprising one or more pressure valves that prevent the pressure inside the chamber from exceeding a predetermined pressure.

\* \* \* \* \*